United States Patent [19]

Gallagher et al.

[11] Patent Number: 4,765,736
[45] Date of Patent: Aug. 23, 1988

[54] FREQUENCY MODULATION SPECTROSCOPY USING DUAL FREQUENCY MODULATION AND DETECTION

[75] Inventors: Thomas F. Gallagher; Gary R. Janik; Clinton B. Carlisle, all of Charlottesville, Va.

[73] Assignee: Electric Power Research Institute, Palo Alto, Calif.

[21] Appl. No.: 889,507

[22] Filed: Jul. 24, 1986

[51] Int. Cl.[4] ............................................ G01N 21/31
[52] U.S. Cl. .................................... 356/300; 356/256
[58] Field of Search ............... 356/349, 409, 437, 436, 356/438, 300, 331, 332

[56] References Cited

U.S. PATENT DOCUMENTS 4,297,035 10/1981 Bjorklund ........................... 356/402

OTHER PUBLICATIONS

"Double Frequency Modulation Spectroscopy", Applied Optics, David E. Cooper & T. F. Gallagher, May 1, 1985, vol. 24, No. 9, pp. 1327-1333.

Primary Examiner—R. A. Rosenberger
Assistant Examiner—Steve McGowan
Attorney, Agent, or Firm—Flehr, Hohbach, Test, Albritton & Herbert

[57] ABSTRACT

FM laser spectroscopy apparatus includes a single modulator for modulating a laser beam with first and second modulation signals ($\omega_1$, $\omega_2$). The two modulation signals are generated by mixing a signal from a first oscillator ($\omega_1+\omega_2$)/2 and a signal from a second oscillator ($\omega_1-\omega_2$)/2 and producing the two modulation signals ($\omega_1$, $\omega_2$). The modulator produces three groups of sidebands on the laser beam at the laser frequency plus and minus the two modulation frequencies and at plus and minus the difference between the two modulation signal frequencies. The apparatus provides practical high frequency FM spectroscopy as required for the observation of pressure broadened spectral features.

5 Claims, 2 Drawing Sheets

FIG.—1

FREQUENCY MODULATION SPECTROSCOPY USING DUAL FREQUENCY MODULATION AND DETECTION

BACKGROUND OF THE INVENTION

This invention relates generally to laser spectroscopy, and more particularly the invention relates to frequency modulation laser spectroscopy.

Advances in laser technology have created powerful new tools for spectroscopy. Frequency modulation (FM) laser spectroscopy is a sensitive optical spectroscopy technique for measuring absorption and dispersion in an optical medium. As discussed by Cooper and Gallagher in "Double Frequency Modulation Spectroscopy: High Modulation Frequency Low Bandwidth Detectors", *Applied Optics*, Vol. 24, No. 9, 1 May 1985, Pages 1327–1334, one of the most promising areas for the application of FM spectroscopy is in the detection of atmospheric trace gases and hazardous materials. Absorptions as small as $10^{-4}$ have been easily detected with FM spectroscopy using either single mode or multimode CW lasers, and an optimized visible wavelength FM system should be capable of detecting an absorption as small as $10^{-6}$ with a one second integration time.

In FM laser spectroscopy a laser beam of frequency $\omega_o$ is phase modulated at frequency $\Omega$ which is usually greater than the line width $\Delta\omega_o$ of the laser. Typical values are $\Omega = 500$ MHz and $\Delta\omega_o = 1$ MHz. In the limit of low modulation index, the laser beam acquires sidebands at $\omega_o \pm \Omega$ and when the modulated laser beam impinges on a square law detector, such as a photodiode, each sideband beats with the carrier to produce a component of the photo current at $\Omega$. When there is no absorption the two beat signals are 180° out of phase and therefore cancel. If prior to photodetection the modulated beam traverses a medium whose complex index of refraction differs for the two sidebands, the sideband cancellation is incomplete and a photocurrent at $\Omega$ is produced.

In generating the FM sideband, Cooper and Gallagher modulate a laser beam using two modulators, one modulator frequency being $2\Omega + \sigma$ and the other modulation frequency being $\Omega$. The circuitry is somewhat complex in the number of components and in optical and electronic alignment.

SUMMARY OF THE INVENTION

An object of this invention is improved demodulation for FM spectroscopy.

Another object of the invention is practical high frequency FM laser spectroscopy for the observation of pressure broadened spectral features.

A feature of the invention is the use of a single modulation driven at two frequencies in generating side bands for spectroscopic analysis of an optical medium.

Briefly, a laser beam is modulated using one modulator operating at two high frequencies, $\omega_1$ and $\omega_2$, which differ in frequency by $\Delta$ (i.e. $\Delta = \omega_1 - \omega_2$). This modulation puts sidebands on the modulated laser beam, $\omega_0$, at $\omega_0 \pm \omega_1$, $\omega_0 \pm \omega_2$, and $\omega_0 \pm \Delta$. Beat notes at $\Delta$ come from the carrier $\omega_0$ beating with each of the two nearby sidebands at $\omega_0 \pm \Delta$ and from the sidebands at $\omega_0 \pm \omega_1$ beating with the sidebands at $\omega_0 \pm \omega_2$.

By scanning the laser frequency, $\omega_0$, and therefore the sidebands across an absorption frequency range, the frequencies of absorption can be detected. The sign of the beat note contribution from the sidebands at $\omega_0 \pm \omega_1$ and $\omega_o \pm \omega_2$ are positive and the contribution from the carrier at $\omega_0$ and the sidebands at $\omega_0 \pm \Delta$ is negative. The total beat note contribution is equal to zero when there is no absorption or dispersion. When either of the sidebands at $\omega_0 \pm \omega_1$ or $\omega_0 \pm \omega_2$ is absorbed the total beat note contribution is negative. When the carrier $\omega_o$ or the sidebands at $\omega_0 \pm \Delta$ are absorbed, then the total beatnote contribution is positive.

The invention and objects and features thereof will be more readily apparent from the following detailed description and appended claims when taken with the drawing.

DETAILED DESCRIPTION OF THE ILLUSTRATED EMBODIMENT

Figure 1:
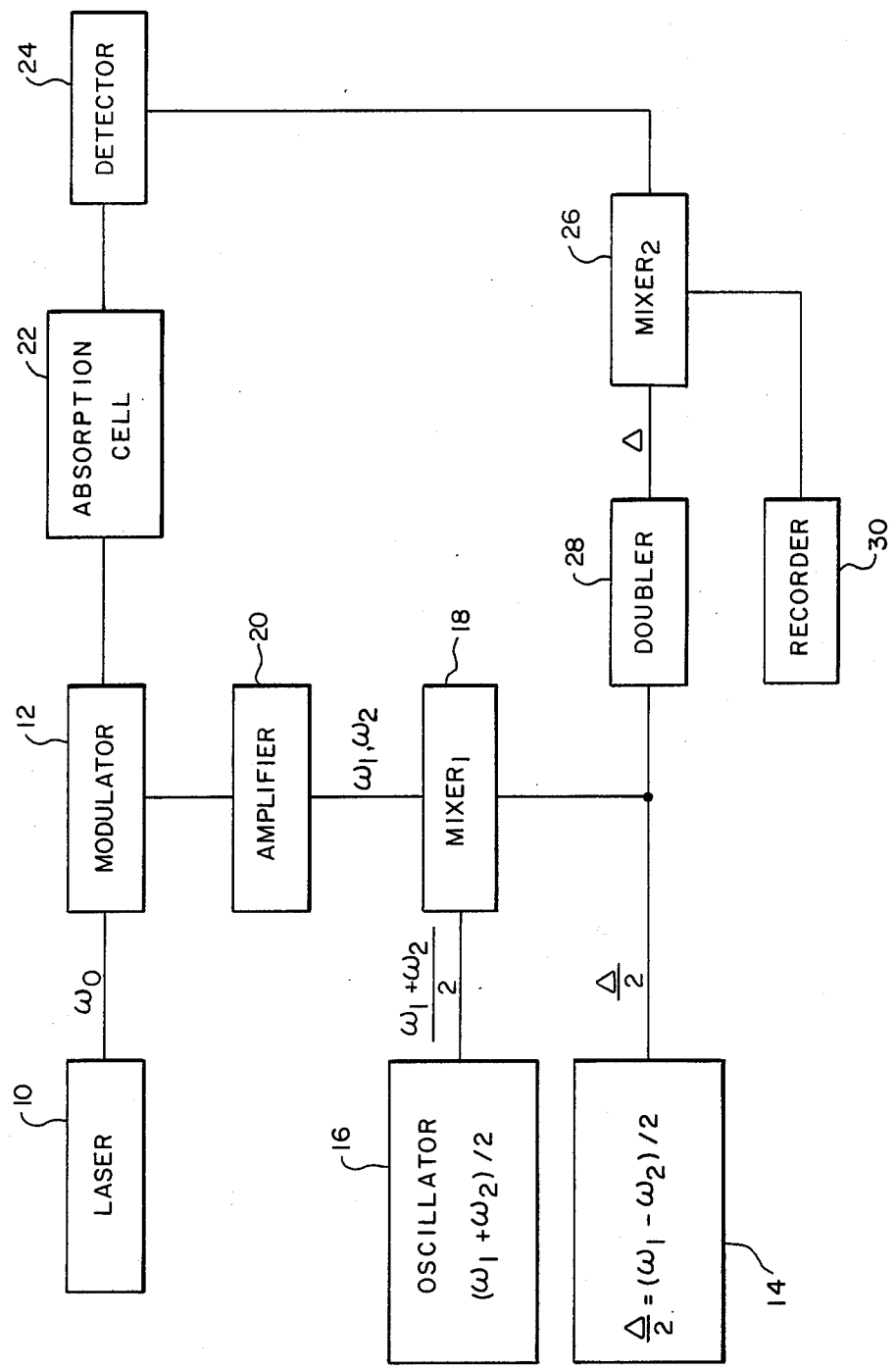
FIG. 1 is a functional block diagram of FM spectroscopy circuitry in accordance with one embodiment of the invention.

Referring now to the drawings, FIG. 1 is a functional block diagram of FM laser spectroscopy apparatus in accordance with one embodiment of the invention. A beam from laser 10 is applied to a modulator 12. The modulation signals $\omega_1$ and $\omega_2$ for the modulator 12 are derived from oscillators 14 and 16 and mixer 18. The two frequencies differ by $\Delta$ ($\Delta = \omega_1 - \omega_2$). Oscillator 14 generates a frequency of $\Delta/2$ or $(\omega_1 - \omega_2)/2$. Oscillator 16 generates a frequency of $(\omega_1 + \omega_2)/2$. Mixer 18 produces an output at the sum and difference of the two oscillator frequencies, or $\omega_1$ and $\omega_2$. The two frequencies are applied through amplifier 20 as the modulation signals to modulator 12.

The modulated carrier signal from laser 10 is then applied through an absorption cell 22 for spectral analysis of a gas therein. The signal received after passing through the absorption cell 22 is detected at 24. The detected signal is then applied to a mixer 26 where it is mixed with a signal at the frequency $\Delta$ obtained by applying the $\Delta/2$ signal from oscillator 14 through frequency doubler 28. The output of mixer 26 is then recorded at 30.

Figure 2:
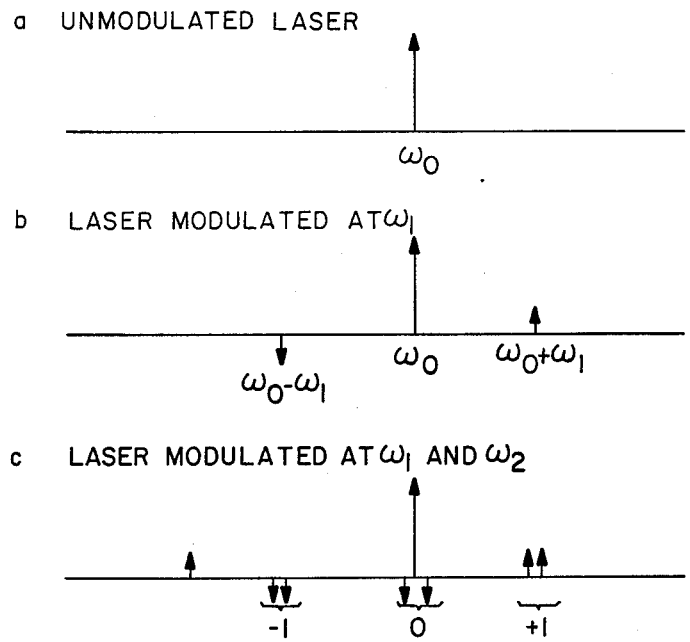
FIGS. 2A–2C illustrate the amplitude spectra of a laser beam without modulation and with modulation.

FIGS. 2A–2C illustrate the frequency spectrum of the unmodulated laser beam, $\omega_0$, in FIG. 2A, the frequency spectrum of the laser beam modulated by a single signal, $\omega_1$, as shown in FIG. 2B, and the frequency spectrum using the two modulation signals of the circuitry of FIG. 1 as shown in FIG. 2C. The signs of the different sidebands are indicated by the directions of the arrows. The groups of sidebands illustrated in FIG. 2C which lead to beat notes at frequency $\Delta$ are grouped together in groups +1, 0, and −1 as illustrated. The group designations indicate the average displacement in terms of $(\omega_1 + \omega_2)/2$. The signs of the beat note contributions at frequency $\Delta$ are determined by the signs of the products of the groups 1, 0, and −1. As shown in FIG. 2C beat note contributions from +1 and −1 are positive in sign, and the contributions from 0 are negative in sign. In the limit of low modulation indices $\beta_1$ and $\beta_2$ at frequencies $\omega_1$ and $\omega_2$ in the case of practical interest, one may ignore higher sidebands, and the beat notes at Δ from group 0 come from the carrier beating with each of two nearby sidebands. The beat note signals from +1, 0, and −1 are given by $$\Gamma_{+1} = \Gamma_{-1} = J_1(\beta_1)J_0(\beta_2)J_0(\beta_1)J_1(\beta_2)$$

$$\Gamma_0 = -J_0(\beta_1)J_0(\beta_2)J_1(\beta_1)J_1(\beta_2) - J_0(\beta_1)J_0(\beta_2)J_1(\beta_2)J_1(\beta_1)$$

where $J_o$ and $J_1$ are Bessel functions.

Figure 3:
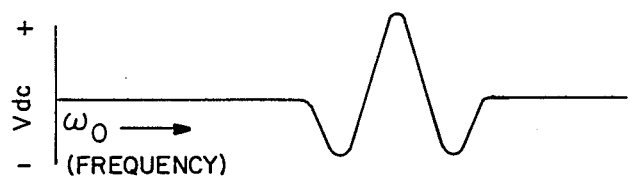
FIG. 3 is a curve of a theoretical absorption spectrum using the apparatus of FIG. 1.
Figure 4:
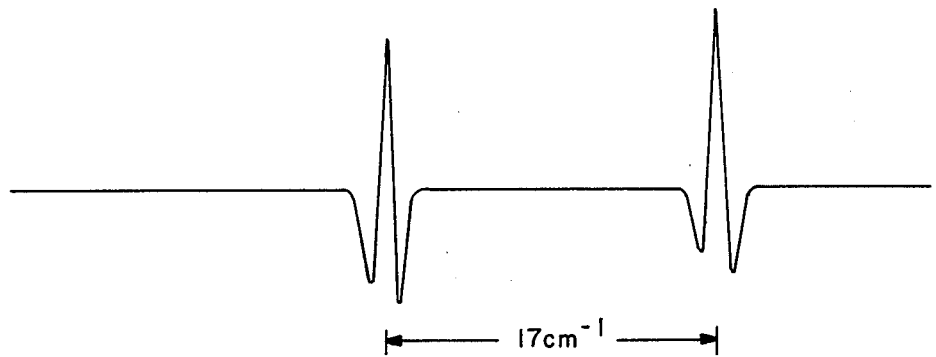
FIG. 4 is a plot of actual two tone absorption spectrum using the apparatus of FIG. 1.

In the limit of low modulation indices $J_o(\beta_1) = J_o(\beta_2) = 1$, and clearly the net signal $\Gamma = \Gamma_{+1} + \Gamma_o + \Gamma_{-1}$ is equal to zero when there is no absorption. However when either the +1 group or the −1 group is absorbed a negative signal is observed, whereas the absorption of the 0 group results in a positive signal. The result of scanning the laser ($\omega_o$) and therefore the sidebands as well, across an absorption is then the curve of FIG. 3. This is in fact the case as shown by FIG. 4 of an experimental demonstration of this technique using the following parameters and components for FIG. 1:

| | |
|---|---|
| laser | Spectra Physics 375 dye laser |
| modulator | 8.4 GHz resonant cavity modulator |
| absorption cell | Na vapor cell |
| detector | EG & G FND 100 photodiode |
| oscillator 1 | Avantek AVD 7872 ($\omega_1 + \omega_2/2$) = 8.38 GHz) |
| oscillator 2 | Hewlett Packard 606B $\omega_1 - \omega_2$ = 10 MHz) |
| Mixer 1 | Watkins Johnson M31A |
| amplifier | Hughes 1277 HO2 Amplifier 8-12 GHz |
| doubler | Minicircuits FK-5 |
| Mixer 2 | Minicircuits ZFM-3 |
| recorder | HP 7035 B |

The invention makes high frequency FM laser spectroscopy very practical. High frequency is necessary for the observation of pressure broadened spectral features, and allows a wider frequency range for retrieval of optically stored information.

While the invention has been described with reference to a specific embodiment, the description is illustrative of the invention and is not to be construed as limiting the invention. Various modifications and applications may occur to those skilled in the art without departing from the true spirit and scope of the invention as defined by the appended claims.

What is claimed is:

1. Apparatus for use in FM laser spectroscopy comprising
    a laser for generating a laser beam ($\omega_0$),
    a first oscillator for generating a first signal at a first frequency ($\omega_1 + \omega_2)/2$,
    a second oscillator for generating a second signal at a second frequency ($\omega_1 - \omega_2)/2$,
    a first mixer for receiving said signals from said first and second oscillators and producing a third signal at a third frequency ($\omega_1$) and a fourth signal at a fourth frequency ($\omega_2$), said third and fourth signals differing in frequency by a frequency difference ($\Delta = \omega_1 - \omega_2$),
    a first modulator,
    means for applying a laser beam from said laser and said third and fourth signals to said modulator, said modulator modulating said laser beam with said third and fourth signals and producing in the limit of low modulation index sideband groups on said laser beam ($\omega_0 \pm \omega_1$, $\omega_0 \pm \omega_2$, $\omega_0 \pm \Delta$),
    means for applying said modulated laser beam through a substance to be analyzed, and
    detector means for detecting said modulated laser beam after passing through said substance, said detector means producing a signal indicative of absorption of said modulated beam by said substance.

2. Apparatus as defined by claim 1 and further including means for recording a signal produced by said detector.

3. Apparatus as defined by claim 2 wherein said means for recording includes a second mixer, a doubler for receiving and doubling said second signal, said mixer receiving said signal from said detector and a signal from said doubler and producing an output signal, and a recorder for receiving and recording said output signal.

4. In FM laser spectroscopy, a method of producing a modulated laser beam with sidebands for use in spectral analysis comprising the steps of
    generating a first signal at a first frequency ($\omega_1 + \omega_2)/2$,
    generating a second signal at a second frequency ($\omega_1 - \omega_2)/2$,
    mixing said first and second signals to generate first and second modulation signals ($\omega_1$, $\omega_2$), and
    modulating a laser beam in a single modulator with said first and second modulation signals.

5. In FM laser spectroscopy, apparatus for producing a modulated laser beam with side bands for spectral analysis comprising
    a first oscillator for generating a signal at a first frequency ($\omega_1 + \omega_2)/2$,
    an oscillator for generating a second signal at a second frequency ($\omega_1 - \omega_2)/2$,
    mixer means for receiving and mixing said first and second signals to generate first and second modulation signals ($\omega_1$, $\omega_2$), and
    a modulator for modulating said laser beam with said first and second modulation signals.

* * * * *